(12) United States Patent
Weaver et al.

(10) Patent No.: US 10,612,664 B2
(45) Date of Patent: Apr. 7, 2020

(54) GIMBAL SYSTEM WITH DUAL-WIPER GASKET FOR A ROTARY SEAL

(71) Applicant: FLIR Systems, Inc., Wilsonville, OR (US)

(72) Inventors: James H. Weaver, West Linn, OR (US); Bruce Ellison, West Linn, OR (US); Chris L. Watkins, Wilsonville, OR (US)

(73) Assignee: FLIR Systems, Inc., Wilsonville, OR (US)

( * ) Notice: Subject to any disclaimer, the term of this patent is extended or adjusted under 35 U.S.C. 154(b) by 183 days.

(21) Appl. No.: 15/721,557

(22) Filed: Sep. 29, 2017

(65) Prior Publication Data

US 2018/0094729 A1 Apr. 5, 2018

Related U.S. Application Data

(60) Provisional application No. 62/402,575, filed on Sep. 30, 2016.

(51) Int. Cl.

| | |
|---|---|
| *F16J 15/3232* | (2016.01) |
| *F16J 15/3216* | (2016.01) |
| *B64D 47/08* | (2006.01) |
| *F16M 11/06* | (2006.01) |
| *G03B 17/08* | (2006.01) |
| *F16J 15/3268* | (2016.01) |
| *F16M 11/08* | (2006.01) |

(Continued)

(52) U.S. Cl.
CPC .......... *F16J 15/3232* (2013.01); *B64D 47/08* (2013.01); *F16J 15/324* (2013.01); *F16J 15/3216* (2013.01); *F16J 15/3268* (2013.01); *F16J 15/3276* (2013.01); *F16M 11/06* (2013.01); *F16M 11/08* (2013.01); *F16M 11/123* (2013.01); *F16M 11/18* (2013.01); *F16M 13/02* (2013.01); *G03B 17/08* (2013.01)

(58) Field of Classification Search
CPC .... F16J 15/3216; F16J 15/3232; F16J 15/324; F16J 15/3268; F16J 15/3276; F16M 11/123
See application file for complete search history.

(56) References Cited

U.S. PATENT DOCUMENTS

| 6,450,868 B1 * | 9/2002 | Zuniga | B24B 37/30 451/288 |
|---|---|---|---|
| 6,623,343 B2 * | 9/2003 | Kajiwara | B24B 37/30 451/288 |

(Continued)

*Primary Examiner* — Gilbert Y Lee
(74) *Attorney, Agent, or Firm* — Haynes and Boone, LLP (57) ABSTRACT

System including a rotary seal created by a dual-wiper gasket. In exemplary embodiments, the system may comprise a mounting portion and a gimbal assembly. The gimbal assembly may include a first gimbal pivotably connected to and supported by the mounting portion for rotation of the first gimbal about a first axis, and a second gimbal pivotably connected to and supported by the first gimbal for rotation of the second gimbal about a second axis transverse to the first axis. The system also may comprise a gasket encircling the first axis and creating a rotary seal between the mounting portion and the first gimbal. The gasket may have an inner wiper encircled by an outer wiper, with both wipers disposed in circumferentially sealed engagement with the mounting portion or the first gimbal.

20 Claims, 5 Drawing Sheets

(51) Int. Cl.
*F16J 15/3276* (2016.01)
*F16M 11/18* (2006.01)
*F16M 13/02* (2006.01)
*F16J 15/324* (2016.01)
*F16M 11/12* (2006.01)

(56) References Cited

U.S. PATENT DOCUMENTS

| | | | |
|---|---|---|---|
| 7,081,042 B2* | 7/2006 | Chen | B24B 37/30 |
| | | | 451/388 |
| 7,090,178 B2 | 8/2006 | Hughes et al. | |
| 7,255,771 B2* | 8/2007 | Chen | B24B 37/30 |
| | | | 156/345.12 |
| 8,475,231 B2* | 7/2013 | Paik | B24B 37/30 |
| | | | 451/288 |
| 2002/0094767 A1* | 7/2002 | Zuniga | B24B 37/30 |
| | | | 451/288 |
| 2009/0181554 A1* | 7/2009 | Chin | F16J 15/064 |
| | | | 439/13 |
| 2017/0343108 A1* | 11/2017 | Hoang | F16K 3/0227 |

* cited by examiner

Fig. 8

GIMBAL SYSTEM WITH DUAL-WIPER GASKET FOR A ROTARY SEAL

CROSS-REFERENCE TO RELATED APPLICATIONS

This application claims the benefit of and priority to U.S. Provisional Patent Application No. 62/402,575 filed Sep. 30, 2016 and entitled "GIMBAL SYSTEM WITH DUAL-WIPER GASKET FOR A ROTARY SEAL," which is incorporated herein by reference in its entirety.

TECHNICAL FIELD

One or more embodiments of the invention relate generally to gimbal systems and more particularly, to sealing rotary joints in gimbal systems.

BACKGROUND

A gimbal system may incorporate an orientation-dependent device such as an optical detector. The gimbal system has at least two gimbals that offer the optical detector two degrees of rotational freedom via rotary joints. With this rotational freedom, the optical detector may be panned and tilted in order to survey a wide field of view or aim at a specific target.

The gimbal system may be exposed to changing and sometimes harsh environmental conditions. For example, the gimbal system may be used in a marine environment in which saltwater is driven against the housing of the gimbal system, and particularly a rotary joint thereof, through wave action in heavy seas. To ensure robust system performance, sensitive components inside the housing should be isolated from potentially damaging aspects of the ambient environment by sealing any vulnerable rotary joint with a rotary seal. The rotary seal may, for example, be a face seal or a radial seal, each formed with a gasket that creates a movable, fluid-tight barrier between housing surfaces. The housing surfaces may be offset at least generally axially (the face seal), or at least generally radially (the radial seal), from one another.

Both types of rotary seal can be suboptimal for a gimbal system. Each type of rotary seal typically requires high friction to achieve an effective barrier to fluid. However, high friction impedes rotation at the rotary seal and thus requires more power for normal operation, which may necessitate use of a larger motor/drivetrain. A radial seal is subject to coefficient of expansion (COE) mismatch with the housing, which causes a large variation in friction and seal capability with temperature. A face seal can be very sensitive to gap height tolerance stack up between the housing surfaces. All of these drawbacks encourage design of gaskets having a smaller diameter and thus sealing a smaller volume. An improved gasket to create a rotary seal for a gimbal system is needed.

SUMMARY

The present disclosure provides a system including a rotary seal created by a dual-wiper gasket. In exemplary embodiments, the system may comprise a mounting portion and a gimbal assembly. The gimbal assembly may include a first gimbal pivotably connected to and supported by the mounting portion for rotation of the first gimbal about a first axis, and a second gimbal pivotably connected to and supported by the first gimbal for rotation of the second gimbal about a second axis transverse to the first axis. The system also may comprise a gasket encircling the first axis and creating a rotary seal between the mounting portion and the first gimbal. The gasket may have an inner wiper encircled by an outer wiper, with both wipers disposed in circumferentially sealed engagement with the mounting portion or the first gimbal.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the invention and their advantages are best understood by referring to the detailed description that follows. It should be appreciated that like reference numerals are used to identify like elements illustrated in one or more of the figures.

DETAILED DESCRIPTION

The present disclosure provides a system including a rotary seal created by a dual-wiper gasket. In exemplary embodiments, the system may comprise a mounting portion and a gimbal assembly. The gimbal assembly may include a first gimbal pivotably connected to and supported by the mounting portion for rotation of the first gimbal about a first axis, and a second gimbal pivotably connected to and supported by the first gimbal for rotation of the second gimbal about a second axis transverse to the first axis. The system also may comprise a gasket encircling the first axis and creating a rotary seal between the mounting portion and the first gimbal. The gasket may have an inner wiper encircled by an outer wiper, with both wipers disposed in circumferentially sealed engagement with the mounting portion or the first gimbal.

The gasket and corresponding low-friction, rotary seal of the present disclosure have various advantages in a rotary joint over the gaskets and dynamic seals of the prior art. These advantages may include any combination of the following. The gasket may provide a low-torque rotary seal that protects against contamination from operation in hazardous environments. The rotary seal may not be sensitive to coefficient of expansion mismatch. The rotary seal may maintain a fluid-tight seal during continuous, intermittent, and reversing operation of the rotary joint. Internal pressure may help to close the rotary seal more tightly adjacent its inner diameter, and external pressure (e.g., heavy seas wave action) may help to close the rotary seal more tightly adjacent its outer diameter. The rotary seal may have low-torque friction from the vertical direction.

A low spring rate/stiffness of the gasket, and particularly wipers thereof, may provide a fluid-tight seal with a greater mechanical tolerance stack up. Accordingly, the rotary seal may have a larger diameter, thus increasing the protected volume for housed components. The gasket may be thin in cross-section, to reduce cost, weight, and/or stiffness, and/or may have a snap-in assembly. The gasket may have a channel that provides a lubrication reservoir. The gasket may be formed of various polymers (e.g., elastomers), which may allow the gasket to be injection molded, cast, extruded (and optionally then spliced), or the like. The gasket may be formed of a polymer that is resistant to chemicals, a wide temperature range, ozone, fuels, and/or water (e.g., seawater), among others. The rotary seal may be integrated with labyrinths, EMI seals, ferrofluidic gas seals, and/or heavy seas water diverters.

Further aspects of the present disclosure are described herein with reference to FIGS. 1-10, and include a gimbal system utilizing a dual-wiper gasket, a rotary seal formed with a dual-wiper gasket, a housing drain structure for invertible operation, payloads, and support platforms.

Figure 1:
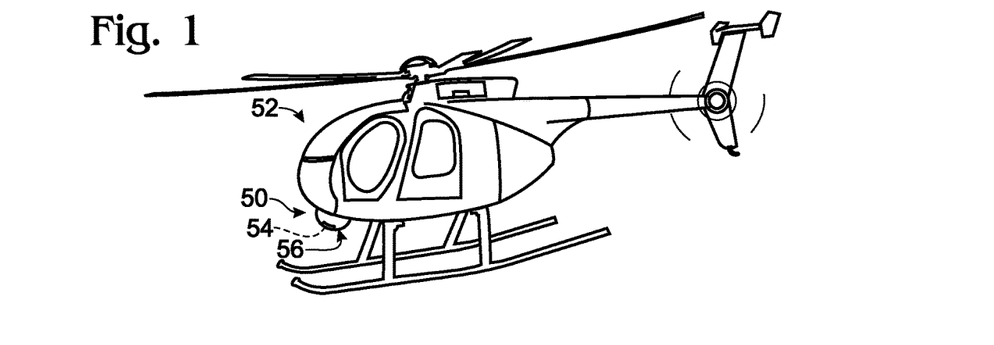
FIG. 1 is a view of an exemplary gimbal system including a dual-wiper gasket, with the gimbal system mounted to an exemplary support platform, namely, an aircraft, in accordance with aspects of the present disclosure.
Figure 2:
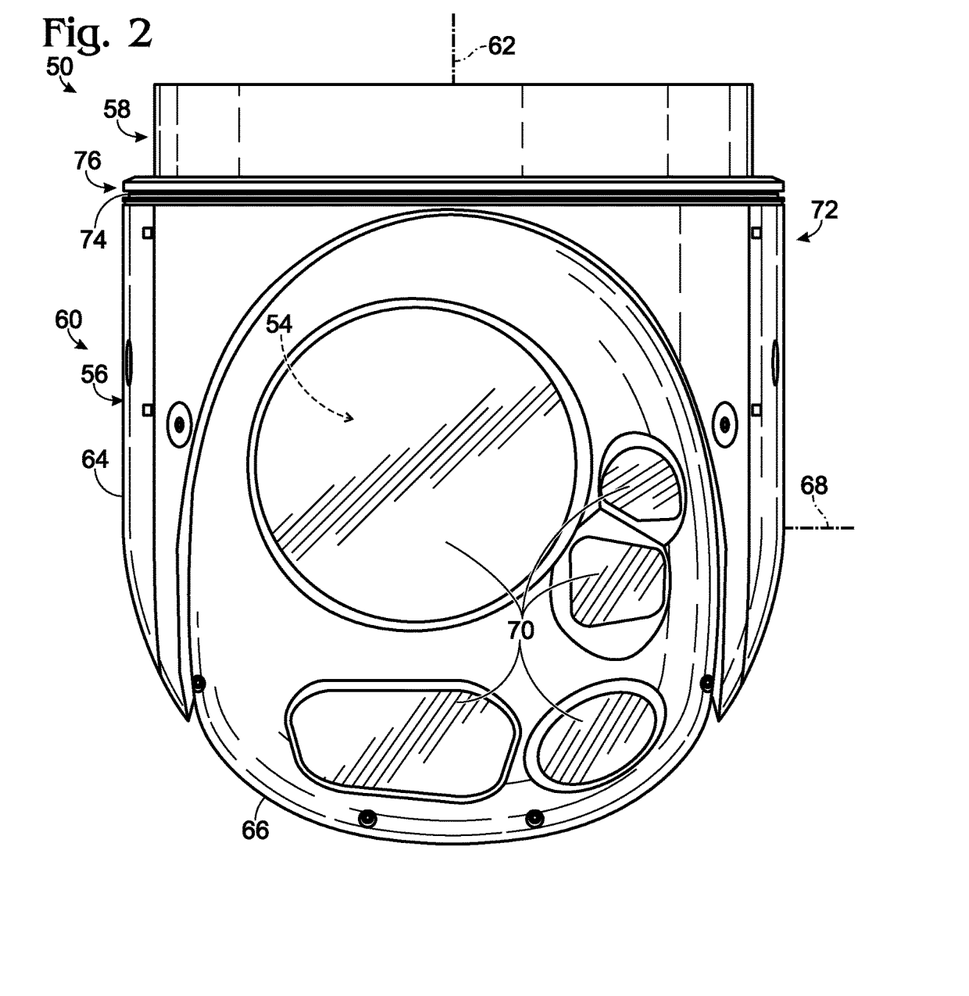
FIG. 2 is an elevational view of the gimbal system of FIG. 1 taken in the absence of the support platform, in accordance with aspects of the present disclosure.
Figure 3:
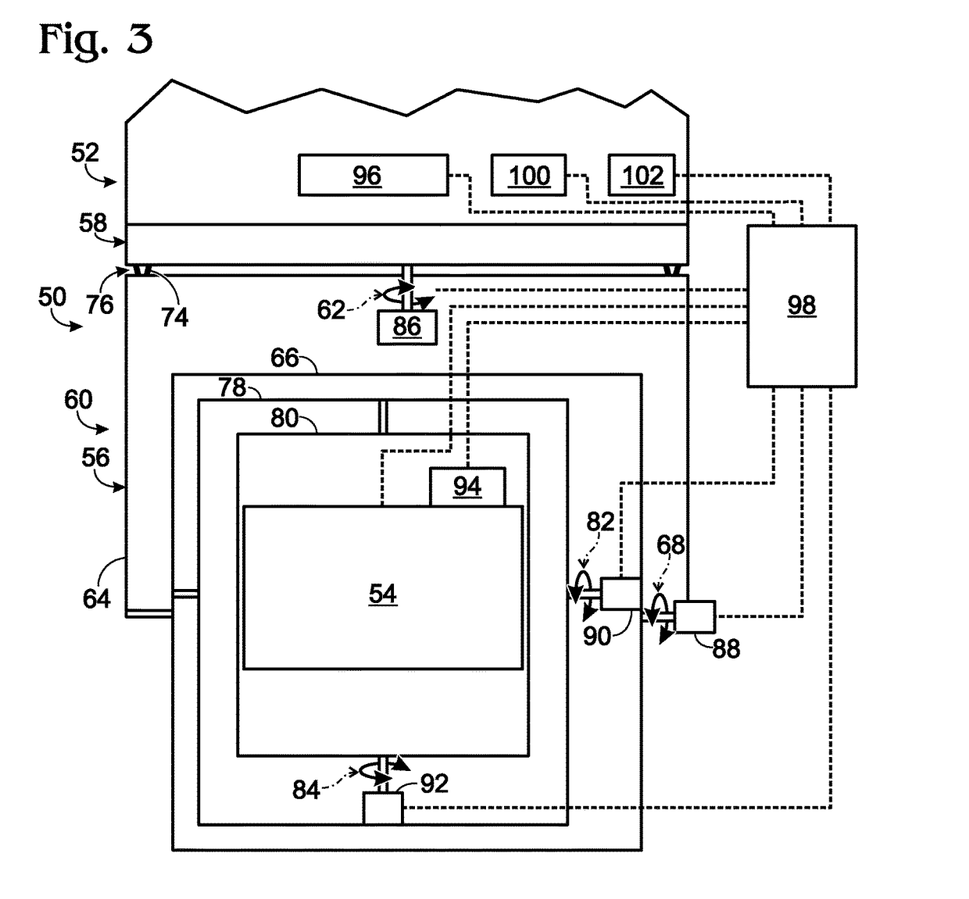
FIG. 3 is a schematic view of the gimbal system and support platform of FIG. 1, in accordance with aspects of the present disclosure.

FIGS. 1-3 describe an exemplary gimbal system 50 including a dual-wiper gasket that forms an azimuthal rotary seal. FIG. 1 shows gimbal system 50 mounted to an exemplary support platform 52 (here, a helicopter). The gimbal system contains a payload 54 (e.g., an imaging detector) that is aimed azimuthally (panned) and elevationally (tilted) by a gimbal assembly 56 of motor-driven gimbals.

FIG. 2 shows gimbal system 50 without support platform 52. The gimbal system has a mounting portion 58 (interchangeably called a fixed portion or a base), and a pivotable portion 60 connected pivotably to the mounting portion for rotation about an azimuthal rotation axis 62. Mounting portion 58 is configured to support pivotable portion 60 and provide attachment sites for mounting the gimbal system to support platform 52. Pivotable portion 60 includes payload 54 and gimbal assembly 56. The permitted range of rotation of the pivotable portion relative to the mounting portion may be any angular range, such as 360 degrees, at least about (or no more than) 180, 90, 45, 20, or 10 degrees, among others.

The gimbal assembly includes a series of two or more gimbals (i.e., pivotable supports), with each gimbal being supported by a preceding gimbal of the series and/or supporting a succeeding gimbal of the series. For example, gimbal assembly 56 includes a first gimbal 64 (an azimuthal gimbal) supported by mounting portion 58 and pivotable about rotation axis 62, and a second gimbal 66 (an elevational gimbal) supported by first gimbal 64 and pivotable about elevational rotation axis 68. The second gimbal may contain payload 54, and may have one or more windows 70 that permit transmission of electromagnetic radiation, and particularly optical radiation, to and/or from the payload.

Mounting portion 58 and first gimbal 64 collectively form at least part of a housing 72 of the gimbal system. The housing is sealed at the gap between the mounting portion and the first gimbal by a dual-wiper gasket 74, which may form a fluid-tight, circumferential, rotary seal 76. The rotary seal permits pivotal motion of the first gimbal with respect to the mounting portion while maintaining a circumferential fluid-tight seal between these components.

FIG. 3 shows a schematic view of selected aspects of gimbal system 50. Pivotable portion 60 may be pivotably connected to and supported by mounting portion 58 (e.g., with the pivotable portion located below or above the mounting portion, among others) and pivotable as a unit with respect to the mounting portion (and support platform 52). Payload 54 is orientable with respect to mounting portion 58 (and support platform 52) by pivotal motion of gimbals of gimbal assembly 56 about a plurality of axes (e.g., at least two nonparallel axes, such as a pair of transverse (e.g., orthogonal) axes).

Gimbal assembly 56 may comprise a series of two or more gimbals, such as first through fourth gimbals 64, 66, 78, and 80. The two or more gimbals may be nested. Each gimbal is a support that is pivotably connected to a preceding and/or a succeeding gimbal of the series, for example, via one or more axles. First gimbal 64 supports second through fourth gimbals 66, 78, and 80, and payload 54, and is pivotably connected to and supported by mounting portion 58 for rotation about axis 62 (e.g., a first yaw, azimuthal, and/or vertical axis), which may extend centrally through mounting portion 58 and/or gimbal system 50. Second gimbal 66 supports third and fourth gimbals 78, 80 and payload 54, and is pivotably connected to and supported by first gimbal 64 for rotation about axis 68 (e.g., a first pitch, elevational, and/or horizontal axis), which may be transverse (e.g., orthogonal) to first axis 62. Third gimbal 78 supports fourth gimbal 80 and payload 54 and is pivotably connected to and supported by second gimbal 66 for rotation about a third axis 82 (e.g., a second pitch, elevational, and/or horizontal axis). Third axis 82 may be parallel to, and optionally coaxial with, axis 68 (or axis 62) when the gimbal assembly is arranged in a neutral position. Fourth gimbal 80 supports payload 54 and is pivotably connected to and supported by third gimbal 78 for rotation about a fourth axis 84 (e.g., a second yaw, azimuthal, and/or vertical axis). Fourth axis 84 may be parallel to, and optionally coaxial with, axis 62 (or axis 68) when the gimbal assembly is arranged in a neutral position. The payload may (or may not) be firmly attached to the fourth gimbal. In some cases, rotation of first and second gimbals 64, 66, which may be outer gimbals, may provide larger adjustments to the orientation of payload 54, and rotation of third and fourth gimbals 78 and 80, which may be inner gimbals, may provide smaller adjustments to the orientation. (or vice versa). In some cases, the third and fourth gimbals may be absent.

Rotation of each gimbal 64, 66, 78, and 80 may be driven by a corresponding motor 86, 88, 90, and 92, respectively. Each motor may be attached to its corresponding gimbal or to the structure that supports the gimbal, or a combination thereof. For example, motor 86 may be attached to mounting portion 58 or first gimbal 64, motor 88 to first gimbal 64 or second gimbal 66, and so on. Accordingly, the angular orientation of the payload may be adjusted horizontally and vertically via rotation of gimbals 64, 66, 78, and 80, without changing the orientation of support platform 52, and/or the payload may continue to point at a target as the orientation of support platform 52 changes, among others. Accordingly, the gimbal system may allow one or more fixed and/or moving targets to be monitored or tracked over time from a fixed and/or moving support platform 52.

The gimbal system also may comprise one or more sensors to sense aspects of the support platform, one or more gimbals, the payload, or a target. Exemplary sensors include an orientation sensor (e.g., a gyroscope that measures angular position or rate of angular change, among others), an accelerometer, an optical sensor to detect optical radiation (e.g., an imaging detector), or the like. At least one gimbal of the gimbal assembly and/or the payload may be attached to at least one gyroscope 94 to measure the orientation of the gimbal and/or payload. In some cases, the gimbal system may include at least one inertial measurement unit (IMU) 96, which may be carried by gimbal assembly 56 (e.g., by payload 54 or fourth gimbal 80), and/or support platform 52. The IMU includes sensors to measure acceleration along three orthogonal axes and angular position/change about three orthogonal axes. Measurements from unit 96 alone or in combination with those from one or more other gyroscopes of the gimbal assembly may be used to aim the payload with respect to an inertial reference frame (e.g., the earth), as the vehicle travels with respect to the reference frame.

Gimbal system 50 also may comprise a processor 98, and a user interface 100 to communicate user preferences, commands, etc., to the processor. The user interface may be disposed in the support platform, if the support platform has a person onboard, or may be disposed elsewhere (e.g., on the ground) if the support platform is unmanned.

The processor may include any electronic device or set of electronic devices responsible for signal processing, manipulation of data, and/or communication between or among gimbal system components. The processor may be localized to one site or may be distributed to two or more spaced sites of the gimbal system. The processor may be programmed to receive user inputs from user interface 100 and to control operation of and/or receive signals from any suitable system components, as indicated by dashed lines in FIG. 3, for example, the motors, sensors (e.g., one or more optical devices, an IMU(s), gyroscopes, accelerometers, etc.), payload 54, a display 102 carried by support platform 52, and so on. Accordingly, the processor may be in communication with the motors, sensors, and display, to receive signals from and/or send signals to these devices, and may be capable of controlling and/or responding to operation of these devices. Also, the processor may be responsible for manipulating (processing) image data (i.e., a video signal) received from payload 54 before the signal is communicated to display 102, to drive formation of visible images by the display.

Gimbal system may include and/or be connected to a power supply. The power supply may include any mechanism for supplying power, such as electrical power, to the motors, sensors, camera, processor, etc. The power supply may be contained by the support platform, the mounting portion, the gimbal assembly, or a combination thereof, among others. Suitable power supplies may generate, condition, and/or deliver power, including AC and/or DC power, in continuous and/or pulsed modes. Exemplary power supplies may include batteries, AC-to-DC converters, DC-to-AC converters, and so on.

Figure 4:
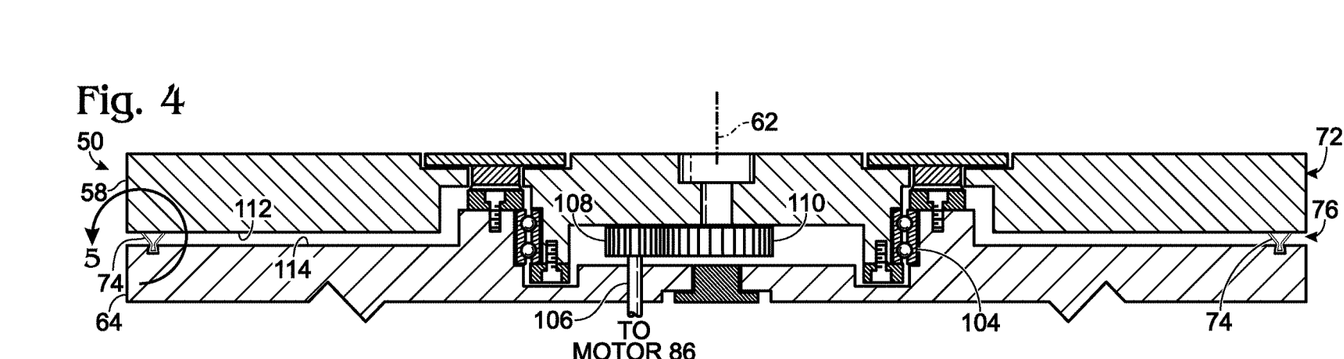
FIG. 4 is a schematic, fragmentary, sectional view of only an upper portion of the gimbal system of FIG. 2, with the gimbal system sectioned vertically at its central axis to show the dual-wiper gasket that creates a rotary seal between a fixed portion and a pivotable portion of the gimbal system, in accordance with aspects of the present disclosure.

FIGS. 4-8 describe a rotary seal 76 formed with an exemplary dual-wiper gasket 74, and also describe exemplary structural and functional aspects of the gasket in the context of gimbal system 50. FIG. 4 shows a schematic view of an upper portion of gimbal system 50, with the system sectioned along rotation axis 62 through mounting portion 58 and first gimbal 64. Pivotal motion of first gimbal 64 is facilitated by a bearing 104 centered around axis 62 and attached to the mounting portion and the first gimbal. The pivotal motion is driven by motor 86, which transmits torque via a drive shaft 106 to a coupled gear 108, which is meshed with a fixed gear 110 that is firmly attached to mounting portion 58.

Gasket 74 encircles rotation axis 62, optionally near the lateral periphery of housing 72. The gasket provides a circumferential face seal between a surface region 112 of mounting portion 58 and a surface region 114 of first gimbal 64, where the surface regions at least generally face one another across a gap 116 (see FIGS. 4 and 5). The gasket may form a ring that has any suitable shape, such as circular, oval, polygonal, or the like, with a plane defined by the ring oriented orthogonal to rotation axis 62.

Figure 5:
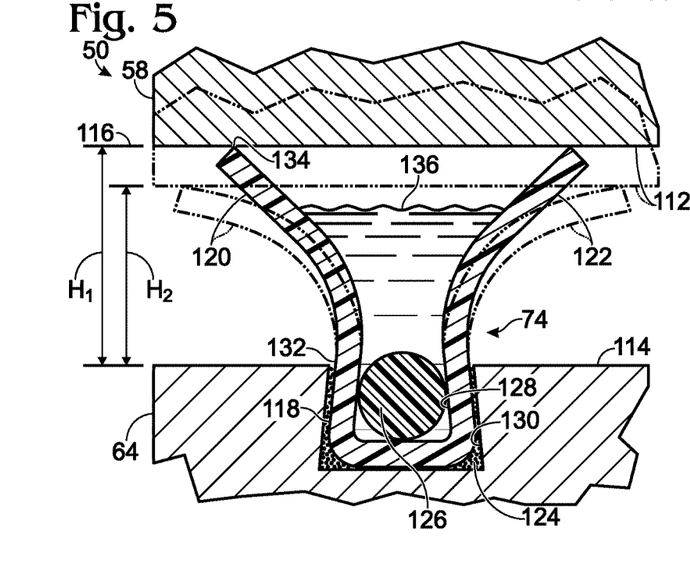
FIG. 5 is a magnified, more detailed view of FIG. 4, taken generally at the region indicated at "5" in FIG. 4 around the gasket, and illustrating in phantom outline how deformation of the gasket maintains a fluid-tight seal between fixed and pivotable portions of the gimbal system through a range of different gap heights between the portions, to, for example, accommodate manufacturing tolerances, in accordance with aspects of the present disclosure.

The gasket has a base 118 connected to a pair of compliant wipers 120, 122 (see FIG. 5). Base 118 may be secured to one of mounting portion 58 and gimbal 64, and wipers 120, 122 movably engage the other of mounting portion 58 and gimbal 64. In other words, the gasket alternatively may be utilized when inverted with respect to its orientation in FIG. 4. Base 118 may be firmly attached in a fluid-tight seal to surface region 114 (or surface region 112). In contrast, wipers 120, 122 slide on surface region 112 (or surface region 114), to maintain a circumferential, fluid-tight seal with surface region 112 when rotation occurs about rotation axis 62. Accordingly, gasket 74 provides a rotary seal that creates a fluid barrier between mounting portion 58 and first gimbal 64, and particularly between surface regions 112, 114 thereof.

Base 118 may be attached to mounting portion 58 (or first gimbal 64) by any suitable approach or combination of approaches. For example, the base may be secured by a press-fit, an adhesive 124, one or more fasteners (e.g., screws, pins, etc.), an O-ring 126 or spline placed into a channel 128 defined by gasket 74 between wipers 120 and 122, and/or the like. The attachment and fluid-tight seal may be facilitated by placing base 118 of the gasket into a channel 130 defined by first gimbal 64 (or mounting portion 58 if the gasket is inverted). The channel thus may be formed in surface region 112 or 114. Channel 130 may match the local cross-sectional and/or circumferential shape of the gasket. In some embodiments, channel 130 may be a dovetail channel (in cross-section) and/or a circular channel (circumferentially).

The wipers include an outer wiper 120 and an inner wiper 122 arranged radially outward and inward of one another. Each wiper interchangeably may be termed a flange or a lip. The wipers may be concentric with one another and each may be centered on rotation axis 62 (also see FIG. 4). Each wiper may encircle rotation axis 62 completely and thus may, for example, be circular. Each wiper may extend from a root 132, at which the wiper may join base 118 integrally, to a rim 134 opposite the root. The diameter of one or both wipers, as measured across the central axis of the gasket between opposite sides thereof, may vary as each wiper extends from rim 134 to root 132 (and base 118). For example, a diameter (e.g., an outer diameter and/or an inner diameter) of outer wiper 120 may decrease toward base 118, such that the outer wiper, considered as a whole, tapers toward the base. Also or alternatively, a diameter (e.g., an outer diameter and/or an inner diameter) of inner wiper 122 may increase toward base 118, such that the inner wiper, considered as a whole, tapers toward rim 134. In other words, the wipers, each considered as a whole, may taper in opposite directions.

Stated differently, the outer wiper and the inner wiper may be angled in opposite directions from one another. Outer wiper 120 may be angled in a radially outward direction from base 118, and inner wiper 122 may be angled in a radially inward direction from the base. Accordingly, a width of channel 128 defined by gasket 74 may vary as the gasket extends from roots 132 to rims 134 of the wipers. For example, the width of channel 128, as measured between outer wiper 120 and inner wiper 122 at a given circumferential position of the gasket, may increase toward rims 134. When the gasket is considered in cross-section as shown, each wiper may extend from root 132 to rim 134 at any suitable average angle with respect to parallel rotation axis 62, such as at least about 2, 5, 10, or 15 degrees, and/or less than about 90, 80, or 70 degrees, among others.

The wipers are resiliently compliant. The angle and/or contour of each wiper can change at least substantially reversibly through elastic deformation of the gasket, which stores mechanical energy. When the wipers are deformed from a neutral (undeformed) position, the stored mechanical energy results in generation of a restoring force that urges the wipers back toward the neutral position. Accordingly, the gasket can function as a spring, which may have a low spring constant (also called a spring rate).

An alternate deformed configuration of the wipers is shown in phantom outline in FIG. 5. The deformability of the gasket, and particularly its low spring rate, allows the gasket to create a low-friction rotary seal with different heights of gap 116, illustrated as $H_1$ and $H_2$ in FIG. 5.

Gasket channel 128 may contain a lubricant 136. The lubricant may have a composition that encourages sliding of rims 134 of the wipers on surface region 112 of mounting portion 58, to reduce friction at the rotary seal. In some embodiments, the lubricant may include an oil.

Figure 6:
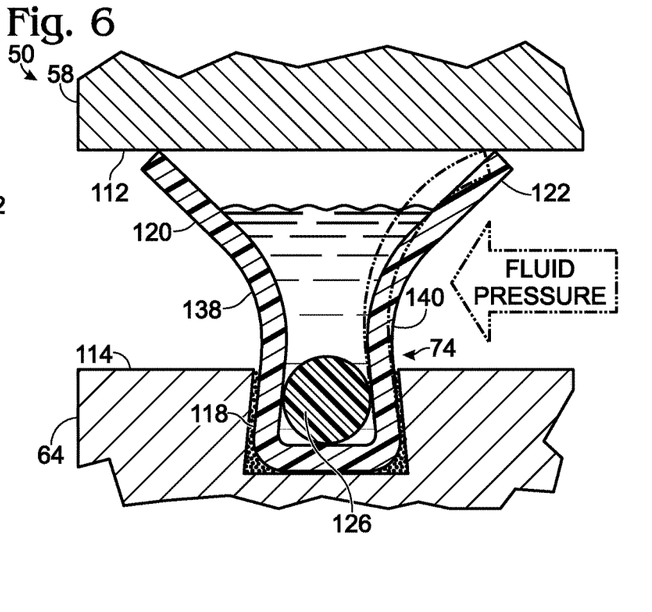
FIG. 6 is another magnified, more detailed view of FIG. 4, taken as in FIG. 5 and illustrating how a pressure differential may urge one of the wipers of the gasket more tightly against a housing surface of the gimbal system, to further resist passage of fluid between inner and outer sides of the gasket, in accordance with aspects of the present disclosure.

FIG. 6 illustrates how the dual-wiper design can take advantage of a pressure differential between an outer side 138 and an inner side 140 of the gasket. Slanting the outer wiper and the inner wiper in opposite directions ensures that one of the wipers remains in sealing engagement with surface region 112 (or surface region 114 if the gasket is inverted), if the pressure inside the housing of the gimbal system becomes less or greater than the pressure outside the housing. For example, in FIG. 6, fluid pressure (e.g., air pressure) on inner side 140 is greater than on outer side 138. This pressure differential, because of the slanted configuration of inner side 138, applies a force that urges inner wiper 122 more tightly against surface region 112. Similarly, if the pressure differential has the opposite polarity, the slanted configuration of outer side 138 urges outer wiper 120 more tightly against surface region 112.

The gasket and surface regions 112, 114 may have any suitable construction and composition. In some embodiments, base 118 of gasket 74 may be formed integrally with wipers 120, 122. For example, the base and wipers may be molded, cast, or extruded as a single unit. The gasket may be composed of a polymer, such as an elastomer, among others. The gasket may be elastically/reversibly deformable. In some embodiments, facing surface regions 112, 114, and/or mounting portion 58 and first gimbal 64, may be formed of metal.

Figure 7:
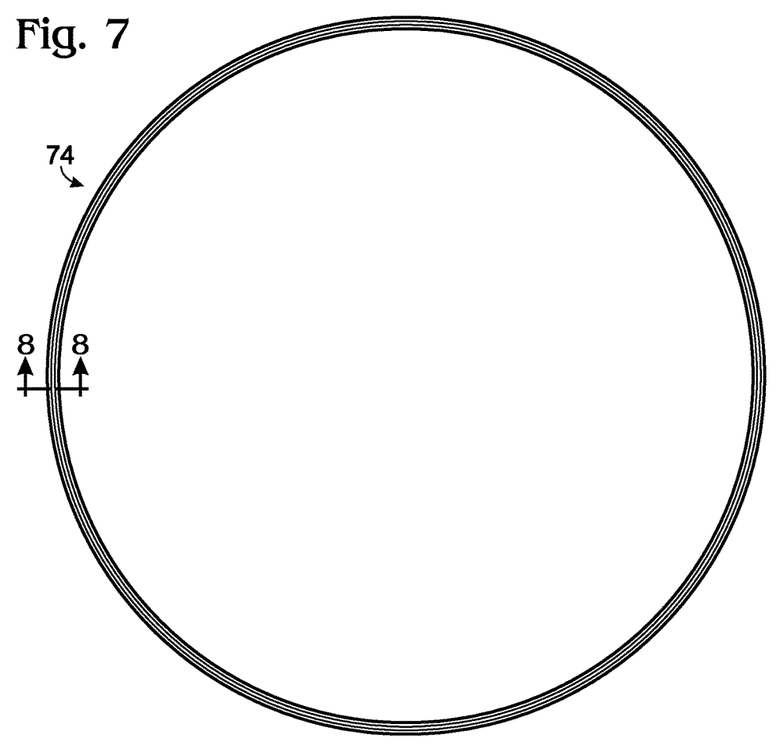
FIG. 7 is a plan view of another exemplary gasket for the gimbal system of FIGS. 1 and 2, taken in isolation from the rest of the gimbal system, in accordance with aspects of the present disclosure.
Figure 8:
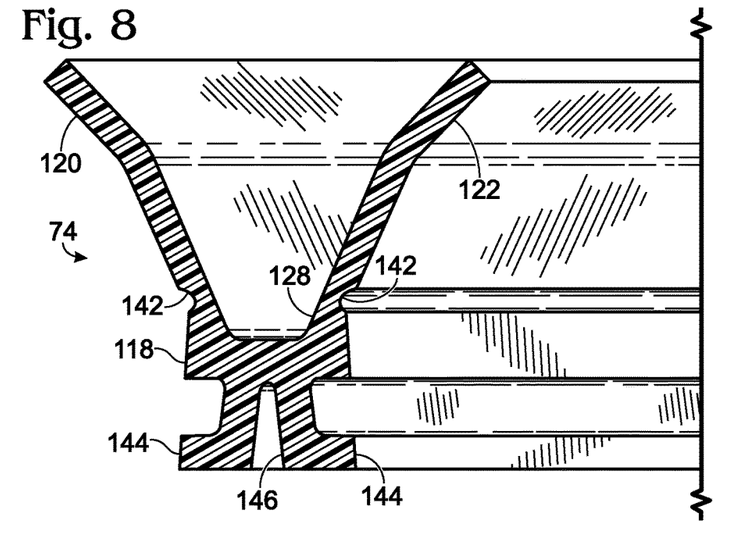
FIG. 8 is a fragmentary, sectional view of the gasket of FIG. 8, taken generally along line 8-8 of FIG. 7.

FIGS. 7 and 8 show another exemplary embodiment of gasket 74. The gasket has a pair of grooves 142 formed on respective inner and outer sides, to facilitate wiper deformation. Each groove is located near the junction between a corresponding wiper and base 118. The base has a pair of feet 144 separated by a slot 146 and elevating channel 128. The slot facilitates deformation of the feet toward one another if the gasket is installed in a housing channel (e.g., channel 130 in FIG. 5).

Figure 9:
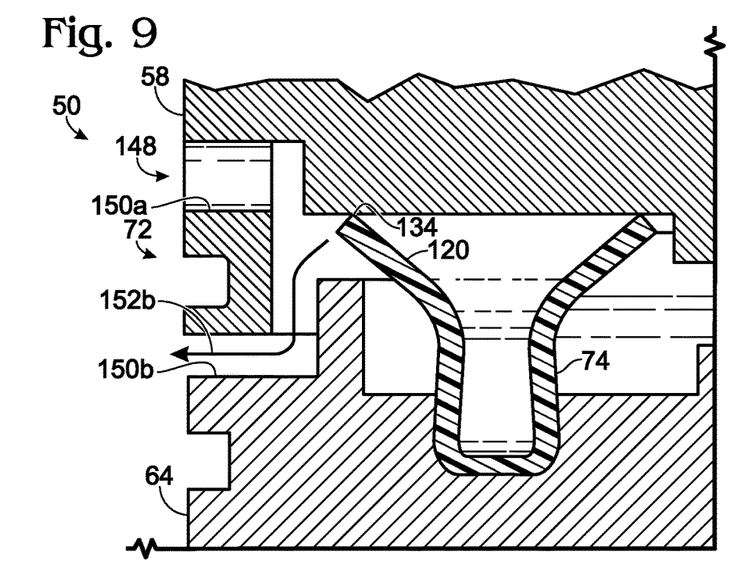
FIG. 9 is a fragmentary, sectional view of another exemplary gimbal system utilizing a dual-wiper gasket and illustrating a channel structure that allows fluid to drain away from the sealing end of the outer wiper of the gasket, in accordance with aspects of the present disclosure.
Figure 10:
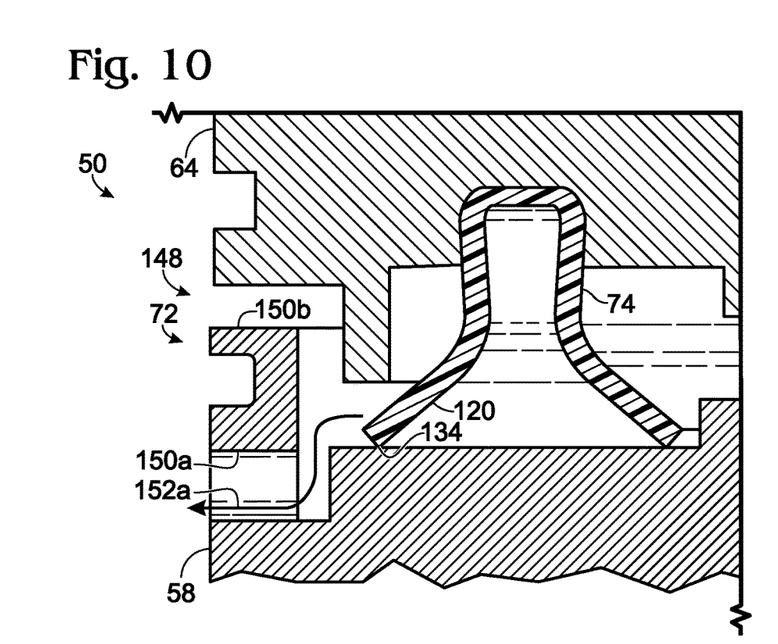
FIG. 10 is a fragmentary, sectional view of the gimbal system of FIG. 9, taken as in FIG. 9 but with the gimbal system inverted relative to FIG. 9.

FIGS. 9 and 10 describe an exemplary drain structure 148 defined by housing 72 of a gimbal system 50, and designed to drain water whether or not the gimbal system is inverted. Drain structure 148 discourages accumulation of standing water adjacent rim 134 of outer wiper 120 of gasket 74. The drain structure includes a pair of outlets 150a, 150b, which are respectively located at a lower elevation than rim 134 when first gimbal 64 is below mounting portion 58 (outlet 150b in FIG. 9) or above the mounting portion (outlet 150a in FIG. 10). Outlet 150a may be defined by mounting portion 58, and outlet 150b by first gimbal 64. Arrows 152a, 152b show a path traveled by water from rim 134 in each of the two orientations of the gimbal system.

Payloads associated with gimbal system 50 will now be described. A payload is any device or collection of devices that is carried and aimed by a gimbal assembly. The payload may include one or more detectors and/or emitters, among others. A detector may create a signal representative of detected energy and/or force, such as electromagnetic radiation, an electric field, a magnetic field, a pressure or pressure difference (e.g., sonic energy), a temperature or temperature difference (e.g., thermal energy), a particle or particles (e.g., high energy particles), movement (e.g., an inertial measurement device), and/or the like. An emitter generally comprises any mechanism for emitting a suitable or desired signal, such as electromagnetic radiation (e.g., via a laser), sonic energy, and/or the like. The payload generally is in communication with a processor that sends signals to and/or receives signals from the payload. The payload may be connected (generally via a processor) to a display such that signals from the payload may be formatted into a visible form for viewing on the display. In some cases, the payload may contain high heat-emitting components, such as lasers, radars, millimeter-wave (MMW) imagers, light detection and ranging (LIDAR) imagers, mine-detection sensors, and/or inertial measurement units (IMUs).

In some embodiments, the payload may form at least a detection portion of an imaging system. An imaging system generally comprises any device or assembly of devices configured to generate an image, or an image signal, based on received energy, such as electromagnetic radiation. Generally, an imaging system detects spatially distributed imaging energy (e.g., visible light and/or infrared radiation, among others) and converts it to a representative signal.

Imaging may involve optically forming a duplicate, counterpart, and/or other representative reproduction of an object or scene, especially using a mirror and/or lens. Detecting may involve recording such a duplicate, counterpart, and/or other representative reproduction, in analog or digital formats, especially using film and/or digital recording mechanisms. Accordingly, an imaging system may include an analog camera that receives radiation (e.g., optical radiation) and exposes film based on the received radiation, thus producing an image on the film. Alternatively, or in addition, an imaging system may include a digital camera that receives radiation (e.g., optical radiation) and generates a digital image signal that includes information that can be used to generate an image that visually portrays the received radiation. Alternatively, or in addition, an imaging system may include an active component such as a laser to illuminate a scene and form an image from one or more reflections of the laser. "Imaging energy," as used herein, may include any type of energy, particularly electromagnetic energy, from which an image can be generated, including but not limited to optical radiation (ultraviolet radiation, visible light, and/or infrared radiation).

Suitable detectors for an imaging system may include (1) array detectors, such as charge-coupled devices (CCDs), charge-injection devices (CIDs), complementary metal-oxide semiconductor (CMOS) arrays, photodiode arrays, microbolometers, and the like, and/or (2) arrays of point detectors, such as photomultiplier tubes (PMTs), photodiodes, pin photodiodes, avalanche photodiodes, photocells, phototubes, and the like. Detectors may be sensitive to the intensity, wavelength, polarization, and/or coherence of the detected imaging energy, among other properties, as well as spatial and/or temporal variations thereof.

The imaging system also may include optics (i.e., one or more optical elements). Exemplary optical elements may include (1) reflective elements (such as mirrors), (2) refractive elements (such as lenses), (3) transmissive or conductive elements (such as fiber optics or light guides), (4) diffractive elements (such as gratings), and/or (5) subtractive elements (such as filters), among others.

The imaging system also may contain gyroscopes and/or other elements arranged to form an inertial measurement unit (IMU) on an optical bench. The IMU may be used to assess the pointing angle of the line-of-sight, as well as geo-location, geo-referencing, geo-pointing, and/or geo-tracking in earth coordinates.

In some embodiments, an imaging system may be capable of generating image signals based on two or more different types or wavebands of imaging energy. For example, the imaging system may be configured to generate a first image signal representative of visible light and a second image signal representative of infrared radiation. Visible light and infrared radiation are both types of electromagnetic radiation; however, they are characterized by different wavebands of electromagnetic radiation that may contain or reflect different information that may be used for different purposes. For example, visible light may be used to generate an image signal that in turn may be used to create a photograph or movie showing how a scene appears to a human observer. In contrast, infrared radiation may be used to generate an image signal that in turn may be used to create a heat profile showing heat intensity information for a scene. More generally, the imaging system may be used with any suitable set of first and second (or first, second, and third (and so on)) image signals, using any suitable wavelength bands. These suitable image signals may include first and second visible wavebands, first and second infrared wavebands, mixtures of visible, infrared, and/or ultraviolet wavebands, and so on, depending on the application.

In some examples, an imaging system may form composite images. The composite images may be straight combinations of two or more other images. However, in some cases, one or both of the images may be processed prior to or during the process of combining the images. Composite images may be formed for use in firefighting, aeronautics, surveillance, and/or the like, for example, by superimposing infrared images of hot spots, runway lights, persons, and/or the like on visible images.

The payload alternatively, or in addition, may include non-imaging systems, such as laser rangefinders, laser designators, laser communication devices, polarimeters, hyperspectral sensors, and/or the like. In some embodiments, the payload may include a plurality of optical devices, such as an infrared camera, a video camera for visible light (e.g., a closed-circuit television camera), a laser rangefinder, a light source that serves as a pointer and/or illuminator, or any combination thereof.

One or more embodiments of support platforms to which gimbal system 50 may be attached will now be described. A support platform, as used herein, generally refers to any mechanism for supporting and/or conveying a gimbal system. The support platform may be movable or fixed in relation to the earth, and may be disposed on the ground, in the air or space, or on and/or in water, among others. In any case, the support platform may be selected to complement the function of the gimbal system, and particularly the payload thereof.

The support platform may be movable, such as a vehicle with or without motive power. Exemplary vehicles include a ground vehicle (e.g., a car, truck, motorcycle, tank, etc.), a watercraft (e.g., a boat, submarine, carrier, etc.), an aircraft (e.g., a fixed-wing piloted aircraft, pilotless remote-controlled aircraft, helicopter, missile, dirigible, aerostat balloon, rocket, etc.), or the like. In some cases, the support platform may include a crane or mast, which may provide hydraulic positioning of the support platform.

The support platform may be fixed in position. Exemplary fixed support platforms may include a building, an observation tower, a wall, a mast, and/or an observation platform, among others.

A gimbal system attached to a movable or fixed support platform may be used for any suitable application(s). Exemplary applications for a gimbal system include navigation, targeting, search and rescue, law enforcement, firefighting, force protection, and/or surveillance, among others.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as program code and/or data, can be stored on one or more computer readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the present invention. Accordingly, the scope of the invention is defined only by the following claims.

What is claimed is:

1. A system comprising:
a mounting portion;
a first gimbal pivotably connected to and supported by the mounting portion, and configured to rotate with respect to the mounting portion about a first axis;
a gasket configured to encircle the first axis to create a rotary seal between the mounting portion and the first gimbal, wherein the gasket comprises:
a base attached to at least one of the mounting portion and the first gimbal; and
an inner wiper encircled by an outer wiper, wherein the inner wiper and the outer wiper are each configured to project from the base into circumferentially sealed engagement with a surface of the other of the mounting portion and the first gimbal.

2. The system of claim 1, wherein a diameter of the inner wiper measured across the first axis decreases as the inner wiper extends away from the base, and wherein a diameter of the outer wiper measured across the first axis increases as the outer wiper extends away from the base.

3. The system of claim 1, wherein a separation of the inner wiper and the outer wiper from one another increases as the inner and outer wipers extend away from the base toward the surface of the other of the mounting portion and the first gimbal.

4. The system of claim 1, wherein the inner wiper and outer wiper are each resiliently deformable to maintain contact with the surface of the other of the mounting portion and the first gimbal over a range of gap heights between the mounting portion and the first gimbal.

5. The system of claim 1, wherein the inner wiper and the outer wiper are each formed integrally with the base.

6. The system of claim 1, wherein the gasket is formed of an elastomer.

7. The system of claim 1, wherein the gasket comprises a channel bounded at least in part by the inner wiper and the outer wiper, and further comprising a lubricant, wherein the lubricant is disposed in the channel configured to reduce friction at the rotary seal.

8. The system of claim 7, further comprising a retaining member configured to be disposed in and extending along at least a majority of a circumference of the channel.

9. The system of claim 8, wherein the retaining member is an O-ring.

10. The system of claim 1, wherein the base of the gasket is attached to at least one of the mounting portion and the first gimbal with an adhesive.

11. The system of claim 1, wherein the gasket is configured to be deformed by pressure exerted on the gasket parallel to the first axis, and wherein the deformed gasket applies a restoring force that urges the wipers against the surface.

12. The system of claim 1, wherein the at least one of the mounting portion and the first gimbal comprises a dovetail groove, and wherein the base of the gasket is disposed in the dovetail groove.

13. The system of claim 1, further comprising a second gimbal pivotably connected to and supported by the first gimbal configured to rotate about a second axis transverse to the first axis.

14. The system of claim 13, further comprising a first motor configured to drive rotation of the first gimbal about the first axis and a second motor configured to drive rotation of the second gimbal about the second axis.

15. The system of claim 13, further comprising an optical detector configured to be connected to and supported by the second gimbal, wherein rotation of the first gimbal about the first axis and rotation of the second gimbal about the second axis allows the optical detector to pan and tilt.

16. The system of claim 15, wherein the optical detector includes an imaging detector.

17. A system comprising:
a mounting portion;
a first gimbal pivotably connected to and supported by the mounting portion via a rotary joint for rotation of the first gimbal relative to the mounting portion about a first axis;
an optical detector;
a gasket encircling the first axis configured to create a rotary seal between the mounting portion and the first gimbal, wherein the gasket comprises:
a base disposed in a groove defined by at least one of the mounting portion and the first gimbal; and
an inner wiper encircled by an outer wiper, wherein the inner wiper and the outer wiper are each configured to project from the base to a surface of the other of the mounting portion and the first gimbal, and wherein a distance from the inner wiper to the outer wiper increases as the inner wiper and the outer wiper extend from the base to the surface of the other of the mounting portion and the first gimbal.

18. The system of claim 17, further comprising a second gimbal pivotably connected to and supported by the first gimbal for rotation of the second gimbal about a second axis that is orthogonal to the first axis.

19. The system of claim 17, wherein the inner wiper has a radially outer surface opposite a radially inner surface, and wherein the distance is defined between the radially outer surface of the outer wiper and the radially inner surface of the inner wiper.

20. A system comprising:
a first portion;
a second portion pivotably connected to the first portion via a rotary joint for rotation of the first portion and the second portion relative to one another about an axis;
a gasket encircling the axis configured to create a fluid-tight rotary seal between the first portion and the second portion, wherein the gasket comprises:
a base attached to the first portion; and
an inner wiper encircled by an outer wiper, wherein the inner wiper and the outer wiper are each configured to form integrally with the base and project from the base into circumferential sealing engagement with a surface of the second portion.

* * * * *